United States Patent
Sosa-Trustham

(10) Patent No.: US 10,984,274 B2
(45) Date of Patent: Apr. 20, 2021

(54) DETECTING HIDDEN ENCODING USING OPTICAL CHARACTER RECOGNITION

(71) Applicant: Seagate Technology LLC, Cupertino, CA (US)

(72) Inventor: John Luis Sosa-Trustham, Scotts Valley, CA (US)

(73) Assignee: Seagate Technology LLC, Fremont, CA (US)

(*) Notice: Subject to any disclaimer, the term of this patent is extended or adjusted under 35 U.S.C. 154(b) by 86 days.

(21) Appl. No.: 16/112,059

(22) Filed: Aug. 24, 2018

(65) Prior Publication Data

US 2020/0065599 A1 Feb. 27, 2020

(51) Int. Cl.
G06K 9/18 (2006.01)
G06K 9/00 (2006.01)
G06K 9/34 (2006.01)

(52) U.S. Cl.
CPC ........... *G06K 9/18* (2013.01); *G06K 9/00979* (2013.01); *G06K 9/344* (2013.01); *G06K 2209/01* (2013.01)

(58) Field of Classification Search
CPC ............. G06F 2221/2113; G06F 21/51; H04L 63/1483; H04L 63/1441; H04L 61/1511; H04L 61/302; G06K 2209/01; G06K 9/6828
See application file for complete search history.

(56) References Cited

U.S. PATENT DOCUMENTS

| | | | |
|---|---|---|---|
| 3,930,231 A | 12/1975 | Henrichon, Jr. et al. | |
| 6,879,701 B1 | 4/2005 | Rhoads | |
| 7,559,085 B1 | 7/2009 | Wahl | |
| 7,644,127 B2 | 1/2010 | Yu | |
| 7,734,092 B2 * | 6/2010 | Curtis | G06K 9/6292 382/182 |
| 8,385,589 B2 | 2/2013 | Erol et al. | |
| 8,707,426 B1 | 4/2014 | Ramzan et al. | |
| 8,943,588 B1 | 1/2015 | Speegle et al. | |
| 9,253,208 B1 | 2/2016 | Koshelev | |

(Continued)

FOREIGN PATENT DOCUMENTS

CN 104156490 A 11/2014

OTHER PUBLICATIONS

Nick Gammon, "Character sets, encodings, and Unicode", Mar. 15, 2017.*

*Primary Examiner* — Dung Hong
(74) *Attorney, Agent, or Firm* — Hall Estill Attorneys at Law

(57) ABSTRACT

Apparatus and method for detecting hidden encoding of text strings, such as Internet web-domain addresses or email addresses, using optical character recognition (OCR) techniques. In some embodiments, a first set of digital data having a first string of text character codes are converted into an image. Optical character recognition (OCR) is applied to the image to generate a second set of digital data having a second string of text character codes based on detection of the image. The first string of text character codes are compared to the second string of text character codes to detect the presence or absence of hidden codes in the first set of digital data. In some cases, a smoothing function such as Gaussian blurring is applied to degrade the image prior to the application of OCR.

19 Claims, 4 Drawing Sheets

(56) References Cited

U.S. PATENT DOCUMENTS

| | | | |
|---|---|---|---|
| 2002/0076111 A1* | 6/2002 | Dance | G06K 9/6828 |
| | | | 382/229 |
| 2008/0008348 A1 | 1/2008 | Metois et al. | |
| 2008/0030798 A1* | 2/2008 | O'Neil | G07D 7/206 |
| | | | 358/448 |
| 2008/0046738 A1 | 2/2008 | Galloway et al. | |
| 2008/0079730 A1* | 4/2008 | Zhang | G06F 40/126 |
| | | | 345/468 |
| 2008/0172741 A1* | 7/2008 | Reumann | H04L 63/1483 |
| | | | 726/23 |
| 2014/0053268 A1 | 2/2014 | Feng et al. | |
| 2014/0283078 A1* | 9/2014 | Redfoot | H04L 63/145 |
| | | | 726/24 |
| 2015/0156210 A1* | 6/2015 | Hunt | H04L 63/1408 |
| | | | 726/23 |
| 2018/0157625 A1* | 6/2018 | Chang | G06F 40/109 |
| 2019/0044975 A1* | 2/2019 | Schafer | H04L 61/307 |
| 2019/0050559 A1* | 2/2019 | McCarty | H04L 63/1441 |
| 2020/0053119 A1* | 2/2020 | Schnieders | H04L 63/101 |

\* cited by examiner

| ASCII CODE (DECIMAL) | UNICODE | CHARACTER |
|---|---|---|
| 097 LATIN LOWERCASE A | U+430 CYRILLIC SMALL LETTER A | a |
| 101 LATIN LOWERCASE E | U+435 CYRILLIC SMALL LETTER IE | e |
| 111 LATIN LOWERCASE O | U+043E CYRILLIC SMALL LETTER O; ALSO U+03BF GREEK SM LTR OMICRON | o |
| 121 LATIN LOWERCASE Y | U+0433 CYRILLIC SMALL LETTER U | y |
| 120 LATIN LOWERCASE X | U+445 CYRILLIC SMALL LETTER HA | x |
| 115 LATIN LOWERCASE S | U+0455 CYRILLIC SMALL LETTER DZE | s |
| 099 LATIN LOWERCASE C | U+03F2 GREEK LUNATE SIGMA | c |
| 106 LATIN LOWERCASE J | U+03F3 GREEK LETTER YOT | j |

FIG. 4

DETECTING HIDDEN ENCODING USING OPTICAL CHARACTER RECOGNITION

SUMMARY

Various embodiments of the present disclosure are generally directed to detecting hidden encoding of text strings, such as Internet web-domain addresses or email addresses, using optical character recognition (OCR) techniques.

In some embodiments, a first set of digital data comprising a first string of text character codes is converted into an image. Optical character recognition (OCR) is applied to the image to generate a second set of digital data comprising a second string of text character codes based on detection of the image. The first string of text character codes are thereafter compared to the second string of text character codes to detect the presence or absence of hidden codes in the first set of digital data. In some cases, a smoothing function such as Gaussian blurring is applied to degrade the image prior to the application of OCR.

These and other features and advantages of various embodiments can be understood from a review of the following detailed description in conjunction with the accompanying drawings.

BRIEF DESCRIPTION OF THE DRAWINGS

FIG. 4 is a table showing different text codes that can be used to render images of similar looking characters.

DETAILED DESCRIPTION

Figure 1:
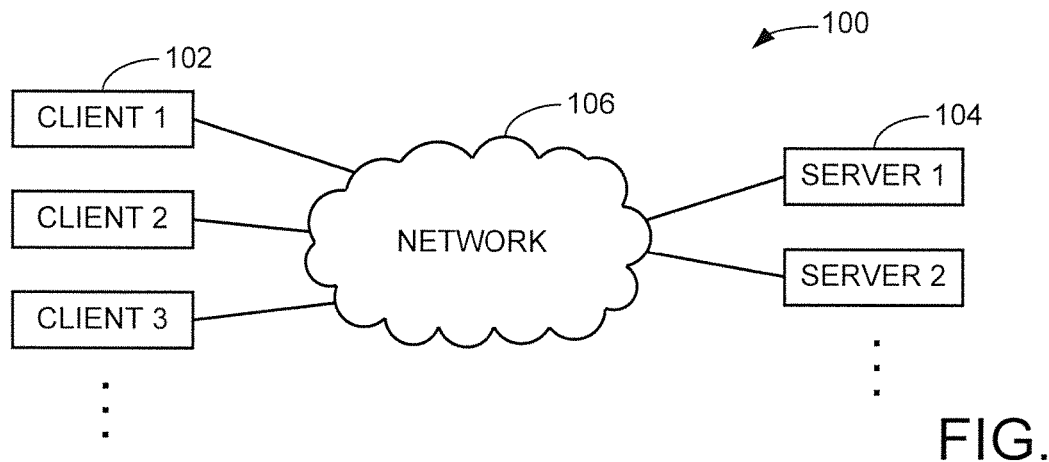
FIG. 1 shows a computer network system constructed and operated in accordance with various embodiments of the present disclosure.

Various embodiments of the present disclosure are generally directed to an apparatus and method for detecting hidden codes in a text string, such as but not limited to a text string of characters making up an Internet web-domain address.

A phishing attack can be generally defined as an attempt to acquire sensitive information in a computer system by providing a malicious electronic communication that masquerades as coming from, or being directed to, a trustworthy entity. Examples include hyperlinks in web pages, emails or other electronic communications that are designed to be selected by recipients of the communications in order to establish a connection. Instead of directing the user device to the intended recipient, the malicious hyperlink connects the user device to a malicious site or other system location.

Some attacks use so-called "lookalike domain names" that are extremely difficult if not impossible for human users to discern. Such domains are in the form of text strings that are formed using multiple characters. For example, ASCII (American Standard Code for Information Interchange) is a well-known character encoding scheme used to represent different characters (so called "Latin text") in various electronic communications. Other characters can be expressed using Unicode, which is another character encoding scheme that supports an expanded set of characters including other languages, etc. The first 128 Unicode characters generally correspond to the characters defined in the ASCII code set.

Some Unicode characters are essentially indistinguishable from characters in the ASCII code set. For example, Unicode U+430 is the code for a Cyrillic small letter A ("a"). This is essentially identical to the ASCII code 097, which is for the Latin small letter A ("a"). Unicode U+435 provides a Cyrillic small letter IE ("e"), and this appears to be essentially identical to ASCII code 101 for the Latin small letter E ("e"), and so on.

A website domain could be potentially arranged in such a way that certain characters were alternative Unicode codes rather than standard Unicode or ASCII codes. An unscrupulous party could use this address to misdirect users to a different, malicious site. Similar attacks could be applied to any number of private domains, email addresses, etc.

Various embodiments of the present disclosure are generally directed to an apparatus and method for detecting hidden codes in text strings through the use of optical character recognition (OCR) techniques. As explained below, some embodiments select a text string from a first set of digital data, such as a digital file for a webpage, etc. The text string is encoded using a suitable character encoding scheme to describe the respective characters. These codes are referred to as the original codes.

The text string is converted to an image file using an image processor to arrange the string as a corresponding set of pixels in memory. While a human viewable display of the image file may be generated, such is not necessarily required.

An OCR module is activated to scan the image file of the text string and to decode, using best detection methods, a corresponding sequence of detected codes. A comparator circuit compares the detected codes to the original codes in the original file to determine if the codes match; if so, no hidden codes are detected and further actions may be taken, such as allowing the user device to make a network connection using the original codes. If the codes do not match, a hidden code arrangement is suspected, leading to further actions including a denial of a network connection until or unless the situation is resolved.

In some cases, the image processing uses a font library having sufficient breadth to encompass the codes used in the original text string to ensure proper decoding is carried out in the formation of the image. Additional processing may be applied to the image, such as a smoothing function using Gaussian blurring techniques, to smooth out the image to better mimic a human in judging the contents of the text string.

Before proceeding further, it may be helpful to offer the following definitions and distinctions regarding the area of character encoding as used herein.

Character: A character (also referred to as a text character) is an agreed upon symbol from a set of symbols used in conveying meaning in a written form of communication (e.g., a writing). Characters include printable or visible characters such as letters, numbers and other symbols appearing on a keyboard, computer screen or printed page. Control characters can also be used as "hidden" characters that relate to formatting, such as tabs, page breaks, etc.

Character Set: A character set as used herein is a standardized set of characters defined in a given character encoding scheme.

Character Encoding Scheme: A character encoding scheme is set of computer codes that comprise a selected number of code points (also referred to herein as codes or text character codes) used to describe a character set. Each code uniquely points to a separate character within the character set covered by the associated character encoding scheme.

ASCII: ASCII stands for American Standard Code for Information Interchange, and is a character encoding scheme used for electronic communications. ASCII codes cover a total of 128 characters (256 in an extended set version) with decimal values of from 0 to 127 ($2^7$). For example, as noted above the ASCII code for the Latin lowercase letter A is 097.

Unicode: Unicode is another character encoding scheme used for electronic communications. Unicode may be thought of as a superset of the ASCII encoding scheme. Unicode accommodates (up to) $17 \times 2^{16}$ (1,114,112) codes, although at present there are only a little more than 100,000 ($10^5$) actual characters that have been assigned to Unicode code points. Various forms of Unicode encoding are governed by the so-called Unicode standard.

UTF-8: This is a variable width form of Unicode encoding capable of encoding all valid code points in Unicode using from one to four 8-bit bytes. The first 128 code points in UTF-8 correspond to the ASCII code set. At present, UTF-8 appears to be the most popular form of encoding in modern computer communications, including XML and HTML communications (e.g., web pages, etc.).

UTF-16 and UTF-32: These are lesser used forms of Unicode encoding. UTF-16 encodes all Unicode code points using one or two 16-bit code units. UTF-32 does this using 32 bits (4 bytes) for every Unicode code point.

Typeface: A typeface is a particular stylized form of a character from an accepted character set. The same character as defined by a particular code point using the ASCII or Unicode character encoding schemes can be expressed in a variety of ways with small differences, such as with or without serifs, but all versions of a given character are still recognizable by a reader as corresponding to that particular character.

Font: A font is defined herein as a set of typefaces that can be rendered with further variations including different sizes, styles and weights. Fonts are rendered by rendering packages (e.g., software, etc.) that use libraries to convert a given code (code point) into the desired visible form. Example fonts include Arial, Times New Roman, Calibri, etc.

Text String: A text string as defined herein is a series of characters as expressed in either digital or image form.

Optical Character Recognition: Optical character recognition, or OCR, is defined herein as a process in which an image having a text string is decoded based on spatial characteristics of the image to arrive at a set of characters that appear to be expressed in the text string. OCR may or may not operate upon an actual human viewable image (e.g., a computer screen, a printed document, etc.) but instead may operate upon an image file as an expression of digital values (e.g., pixels, etc.) that, if printed or displayed, would produce the image as a human viewable image.

FIG. 1 which shows a computer network system 100 constructed and operated in accordance with various embodiments of the present disclosure. The system is geographically distributed and includes a number processing nodes including client devices 102 and servers 104 that communicate via one or more intervening networks 106.

The client devices 102 can constitute substantially any form of network accessible device, including but not limited to a smart phone, a tablet, a laptop, a desktop computer, a workstation, a gaming system, etc. The servers 104 may provide processing and storage capabilities to enable electronic communications using the system 100. The network can include the Internet, a local area network, a wireless network, etc.

Figure 2:
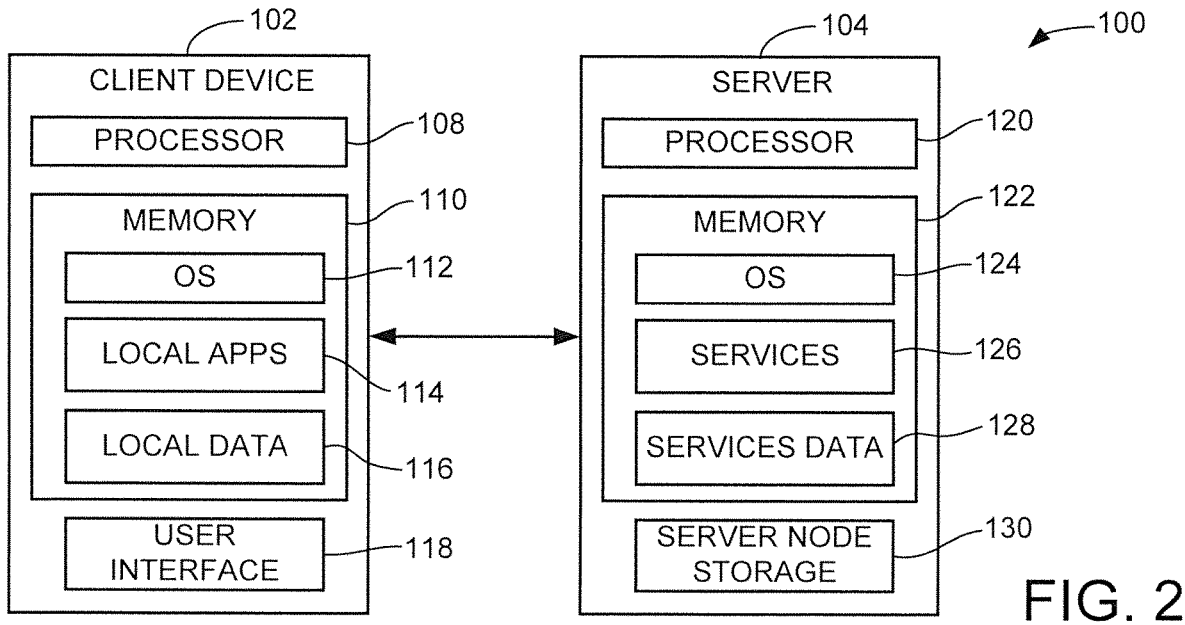
FIG. 2 is a functional block representation of a selected client device and server from FIG. 1 in some embodiments.

FIG. 2 shows a selected client device 102 and a selected server 104 from FIG. 1 in some embodiments. Other configurations can be used so this is merely for purposes of providing a concrete illustration and is not limiting. For purposes of the present discussion, it will be contemplated that the client device 102 constitutes a smart phone, although other forms of client devices can be used as desired.

The client device 102 includes a programmable processor circuit 108 and an internal memory 110. Stored within the memory are various forms of programs and data accessed by the processor including an operating system (OS) 112, one or more local applications (apps) 114 and local app data 116. The local apps 114 can take any number of forms such as a web-browser based or separate API based application that, when executed by the user of the device 102, receives and sends electronic communications to various entities including various servers, other clients, etc. Examples thus include but are not limited to chat apps, email apps, text apps, web browsers, message boards, games, etc.

The local app data 116 provides various data collected and used by the apps 114. A user interface 118 enables the user to interact with the apps 114 such as through a touch screen, keypad, etc.

The server 104 includes one or more programmable processor circuits 120 and memory 122. The memory 122 stores a server OS 124, a server level services 126 and server data 128 accessed by the various processor(s). The services 126 may correspond to and support the local communication apps 114 used by the client device to enable the server to operate as an email server, webpage server, etc. If the server operates as a storage node, additional memory may be provided as server node storage 130 to supply non-volatile memory (NVM) for the storage of user data. The server node storage 130 may be formed from one or more storage devices such as hard disc drives (HDDs), solid-state drives (SSDs), etc.

Figure 3:
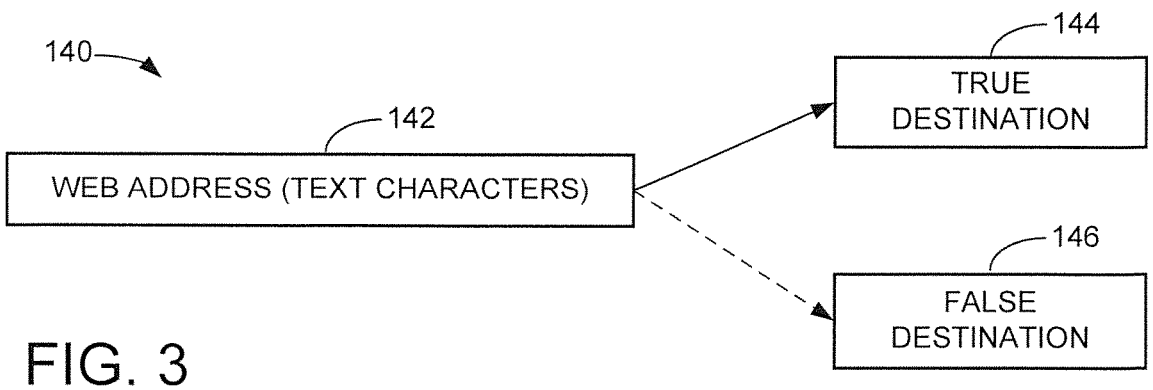
FIG. 3 depicts a text string in the form of an Internet web-domain that may point to a true destination or a false destination depending upon the absence or presence of hidden codes in the text string.

FIG. 3 is a communication sequence 140 established by a user of the client device 102 in some embodiments. A text string 142 such as a web address (e.g., a URL domain) may be presented on the user interface 118 of the client device 102. The text string may be arranged as a sequence of characters that convey to a human observer an association to a desired connection point (e.g., trusted entity) represented by a true destination block 144.

In an illustrative example, the block 144 represents a selected server such as 104 that stores a desired webpage for a company referred to as XYZ Company. The text string 142 incorporate the name of the company, such as xyzcompany.com. By selecting the web address, the user intends to be connected to the associated web page for the company.

FIG. 3 further shows a block 146 for a false or malicious destination that is masked as the true destination of block 144. For example, the false destination could be for ABC Company, an unscrupulous competitor of XYZ Company that wishes to divert traffic to its own website. Should hidden codes be present in the web address, clicking on or otherwise selecting activation of the web address may inadvertently result in a connection to the false destination. The false destination could take some other malicious form, such as a site that attempts to mimic the web page of the true destination in order to obtain confidential information from the user, etc.

FIG. 4 shows a table that illustrates how hidden codes may be input into text strings such as, but not limited to, the web address 142 of FIG. 3. The table includes three columns: the first column identifies various text character codes and associated descriptions using the ASCII character encoding scheme; the second column identifies corresponding text character codes and associated descriptions using a selected Unicode character encoding scheme (in this case, UTF-8 encoding); and the third column renders various characters that identically or closely correspond to the respective ASCII and Unicode code points. To the extent that small differences may arise between the respective encodings, the characters depicted in the third column are the images of the characters using ASCII codes and Arial font.

From FIG. 4 it can be seen that both ASCII 097 and U+430 render a character that resembles a lower case A; ASCII 101 and Unicode U+435 render a lower case E, and so on. In some cases, multiple Unicode code points may point to essentially the same character (e.g., U+043E and U03BF both provide essentially a lower case O). Other similarities exist within the Unicode encoding scheme so these are merely illustrative and not exhaustive.

Returning to the example above in FIG. 3 regarding the XYZ Company domain name xyzcompany.com, it can be seen that the table in FIG. 4 presents a number of opportunities for the attacker to substitute one or more characters to arrive at the false destination address.

Figure 5:
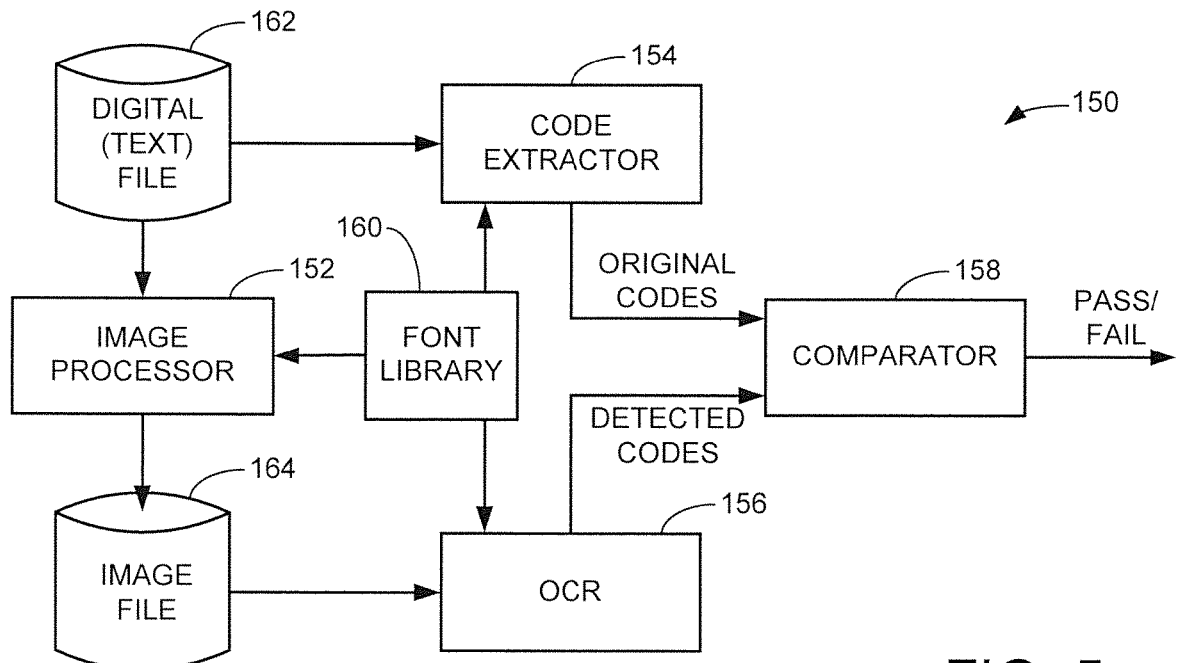
FIG. 5 shows a detection circuit constructed and operated in accordance with some embodiments to detect hidden codes in a text string.

FIG. 5 shows a functional block representation for a detection system 150 constructed and operated in accordance with various embodiments to detect these and other forms of character substitution (e.g., phishing) attacks. The various elements shown in FIG. 5 can be realized using hardware circuits and/or one or more programmable processor circuits and associated programming (e.g., software, firmware, app programs, etc.) and control data. Referring again to FIG. 2, the system 150 can be locally realized in the client device 102, the server device 104, or a combination of both or in other devices (including in one or more local storage devices in the storage 130).

The system 150 generally includes an image processor 152, a code extractor 154, an OCR module 156 and a comparator 158. Other forms and arrangements can be used. In some cases, one or more of the image processor 152, the code extractor 154 and the OCR 156 may utilize a font library 160 as part of the system processing. The font library 160 may be arranged as a data structure in memory that lists various characters by various features including typesets, sizes, codes, etc. Generally, the font library should be sufficiently extensive to cover the various codes evaluated by the system. Multiple libraries may be accessed as required. The system does not necessarily require the use of a font library; in other embodiments, the OCR system can be trained using machine learning techniques.

An original digital (text) file is represented at 162. This is stored in a local memory and may include a text string such as the web address 142 in FIG. 3, or some other text string of characters to be evaluated. It is contemplated that the format of the digital data represented by the digital file include character codes using one (or more) encoding schemes, such as the various schemes discussed in FIG. 4 (e.g., ASCII, Unicode, etc.).

The digital file 162, or portions thereof having the text string(s) under consideration, are forwarded to and evaluated by the respective image processor 152 and the code extractor 154. The image processor 152 operates as explained below to form an image file 164 that includes the text string. The code extractor 154 decodes the text string to acquire a first set of original codes that describe the associated characters in the text string.

The image file 164 is expressed as a set of digital data that includes information arranged to prepare and display an image that corresponds to the text string in the digital file 162. The image may not necessarily be converted to a human viewable form such as via display on a computer screen (see e.g., user interface 118, FIG. 2), a printed hardcopy on a sheet of paper, etc., but such operations can be carried out as desired. Generally, the image file 164 will include spatial mapping information that can be used to direct various pixel values in a printout or display of the characters in the image.

The OCR module 156 operates mechanically and/or electronically to evaluate the spatial relations in the mapping information to decode and identify the characters in the image. A variety of OCR detection packages are known in the art, and in some cases, multiple OCR approaches may be applied to enable the results to be compared.

At least some OCR techniques applied by the module 156 may involve calculating one or more vectors based on the relative locations of points within each character to arrive at a best estimate of the identify of that character. Modern OCR systems include a number of features to account for noise, skew, spacing and other effects to provide accurate detection. In some cases, the OCR 156 may utilize aspects of the font library 160 in order to arrive at a set of detected codes that best describe the detected characters in the image.

The comparator 158 thereafter operates to compare the original codes extracted by the code extractor 154 with the detected codes obtained from the OCR module 156. Should these respective codes match, the comparator 158 will conclude that no hidden codes are present in the text string, and provide a pass indication; contrawise, should a mismatch be detected, the comparator may provide a fail indication. In practice, multiple passes under either or both pass and/or fail conditions may be carried out using different system settings before a final determination is made.

Figure 6:
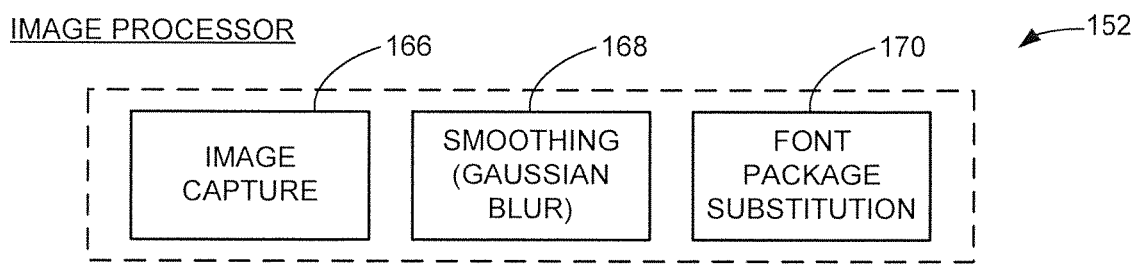
FIG. 6 shows an image processor circuit of FIG. 5 in some embodiments.

FIG. 6 shows the image processor 152 of FIG. 5 in some embodiments. Other arrangements can be used. The processor includes an image capture circuit 166, a smoothing function circuit 168 and a font package substitution circuit 170. The image capture circuit 166 operates to translate the code information in the digital file 162 to the mapping information discussed above to render at least a rudimentary image of the associated characters.

The smoothing function circuit 168 is configured to apply various forms of signal processing to the initial image including the application of so-called Gaussian blurring to smooth out various edges or otherwise soften the image to degrade the image to make it more compatible to how the image might be viewed by a human observer.

For example, modern OCR systems can be extremely effective in detecting differences between letter combinations that may be difficult for a human observer to discern. For example, using two consecutive lower case V letters, such as "vv" can be easily distinguished from a single lower case W, such as "w", by a modern OCR system, while a human observer may not necessarily notice the difference.

Similarly, an OCR system may easily distinguish between a lower case RN sequence "rn" and a lower case M "m", while a human user may not be able to do so. Other combinations of letters can be similarly easily detected via OCR and not easily detected by a human.

It follows that if the original text string uses one of these combinations, a human observer may be easily fooled, but the OCR will indicate that the codes match (e.g., the code properly has two v's in succession although a human might mistake this for a w). In this case, the system 150 may declare a pass condition (e.g., the expected codes match) while the problem still exists that a human may be fooled.

Thus, the smoothing function circuit 168 can be adaptively used by the image processing to apply a blurring function to blur or otherwise degrade the captured image. Different amounts of settings can be used and the comparison process repeated until sufficient levels of confidence are reached.

The font substitution circuit 170 can similarly be used to substitute the rendering of the image, and associated detection, using different font packages. It is generally the case that a given ASCII or Unicode code point will tend to provide the same mapping to the associated character; however, it may be determined through empirical analysis that a particular font style (e.g., Times New Roman, etc.) tends to provide larger differences in styles. Referring again to the table in FIG. 4, the letter "e" as rendered by a first font using the respective 111 and U+0435 codes may be identical, but the same letter rendered by a different, second font using the same codes provide more pronounced differences.

Accordingly, the font substitution circuit can be used to substitute in a variety of different font packages in an attempt to exploit these differences and enhance the likelihood that a hidden encoding scheme has been employed.

Figure 7:
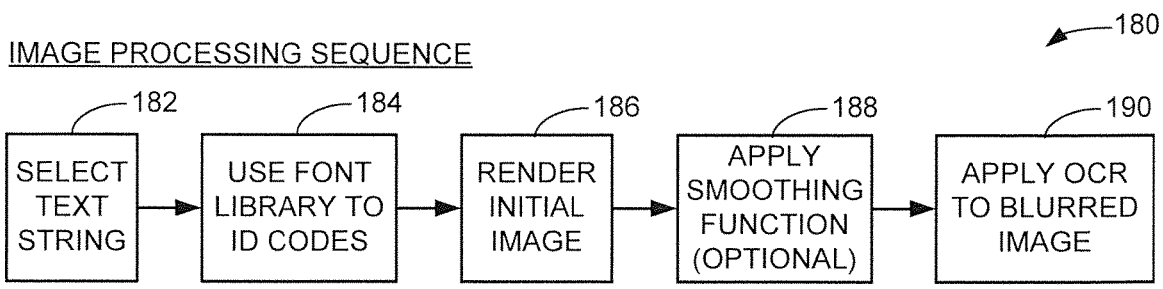
FIG. 7 is a sequence processing diagram to illustrate steps carried out during the image processing of the circuit of FIG. 5 in some embodiments.

FIG. 7 is a sequence diagram for an image processing sequence 180 carried out by the system 150 of FIG. 5 in some embodiments. An initial text string from the digital file under consideration is initially identified and selected at block 182. The font library 160 may be used at block 184 to extract from the digital file the original codes used in the text string.

An initial image is rendered at block 186 using the image capture circuit 166. As desired, optional smoothing or other blending effects may be applied at block 188 by the smoothing circuit 168 to provide a modified (blurred) image. The modified image is thereafter evaluated at block 190 using the OCR 156 as described above.

Figure 8:
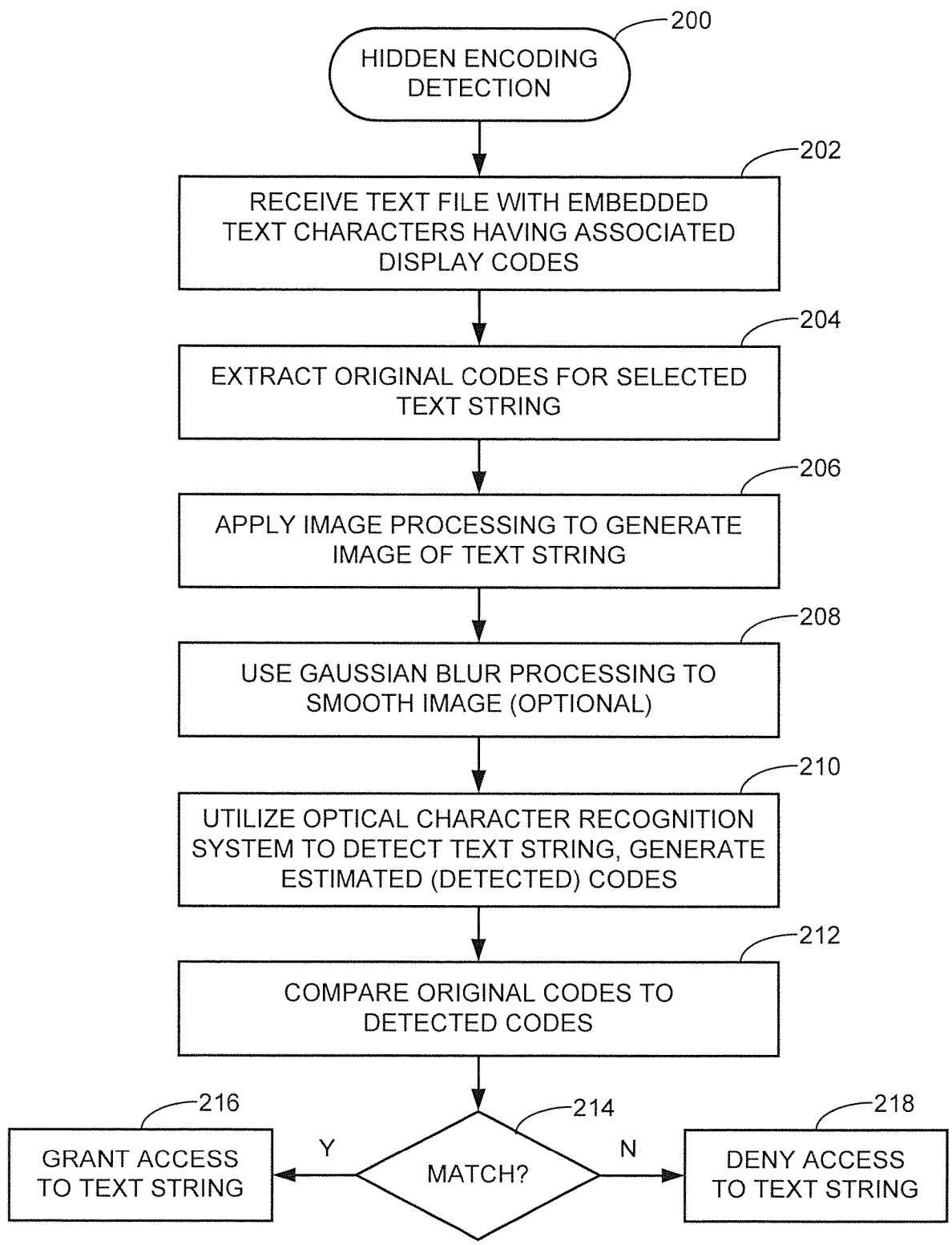
FIG. 8 shows a flow chart for a hidden encoding detection routine.

FIG. 8 provides a flow chart for a hidden encoding detection routine 200 to summarize the foregoing discussion. It will be understood that the flow in FIG. 8 is merely illustrative and may be representative of programming steps carried out by one or more programmable processors. The various steps can be appended, omitted, altered, performed in a different order, etc.

At step 202, a text file is received as a first set of digital data having at least one text string as a sequence of codes corresponding to characters intended to convey meaning to a user. The codes may form, for example, any number of text strings useful in establishing electronic communications such as domain names, email addresses, etc. Essentially any form of hidden code scheme can be present, including the intentional use of such codes for watermarking purposes.

At step 204, the original codes are extracted from the text string, after which the text string is subjected to image processing to convert the string to an image file, step 206. As noted above, this may include displaying the actual image in a human readable form, although such is not necessarily required.

An optional step of applying Gaussian blurring or other signal processing can be carried out at step 208. The image is thereafter subjected to optical character recognition (OCR) to detect a sequence of detected codes that best render the associated image, step 210.

The original and detected codes are compared at step 212. If these match, as indicated by decision step 214, the flow passes to step 216 where access is granted to the text string, such as by permitting the establishment of an electronic communication link to an entity having an address associated with the text string. On the other hand, if the codes do not match, the flow passes to step 218 where such communication is prevented. Part of this processing may involve a notification to the user that there is a mismatch so that further investigation is required. While FIG. 8 only depicts a single pass through the routine, multiple passes can be carried out as desired using different parametric settings and tests under different conditions before arriving at the final determination.

It will be noted that other configurations can be employed; for example, in another embodiment a notification can be provided to the user of the results of the comparison, including the detection or lack of detection of a mismatch between the respective codes. As noted above, in some cases the pass/fail results may be swapped; in some cases the hidden codes may be used as a watermark so that the presence of the codes results in a pass situation (e.g., a genuine original) whereas an absence of the codes indicates malicious intent (e.g., a counterfeit).

It will now be appreciated that the various embodiments presented herein provide a number of benefits. The system can perform an efficient evaluation of a given text string to detect the use of hidden codes to render essentially identical characters. While various embodiments have considered use of the system as a security measure to protect against phishing-type attacks, any number of other applications are envisioned including watermarking of originals using such hidden codes. For example, hidden codes can be inserted to signify a particular object is a certified original, with the idea being that an attempt to replicate the original may result in the insertion of standard codes in place of the hidden codes.

Further efficiencies can be gleaned through the use of the system to adaptively adjust the quality of the acquired image to better reflect a level that is consonant with a human viewer, such as through smoothing functions to introduce degraded quality of the image during the character recognition operation. Finally, both false positives and true detections can be fed into a database or learning system to better equip the system to detect particular character combinations.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
   converting a first set of digital data comprising a first string of text character codes into an image file, the first string of text character codes comprising first code points from a selected one of an ASCII character encoding scheme or a Unicode character encoding scheme;

applying optical character recognition (OCR) to the image file to generate a second set of digital data comprising a second string of text character codes based on detection of characteristics of the image, the second string of text character codes comprising estimated second code points from a selected one of the ASCII character encoding scheme or the Unicode character encoding scheme;

comparing the first code points of the first string of text character codes extracted from the first set of digital data to the estimated second code points of the second string of text character codes detected from the image file through the application of OCR thereto;

generating a notification responsive to a mismatch between the first code points and the estimated second code points of the respective first and second strings of text character codes; and wherein converting the first set of digital data comprises generating an initial image followed by applying a smoothing blurring function to degrade the initial image to form a modified image having degraded boundaries between adjacent characters, wherein the OCR is applied to the modified image.

2. The method of claim 1, wherein the first string of text character codes comprises at least a selected one of a URL domain name pointing to a selected web address or an email address.

3. The method of claim 1, further comprising a font library as a data structure in a memory with text character codes corresponding to the codes in the first set of digital data to render the image.

4. The method of claim 1, wherein the first and second code points are code points in a UTF-8 Unicode character encoding scheme.

5. The method of claim 1, further comprising successively generating different images of the first string of text character codes using different image capture parameters, and applying OCR processing to each of the different images using different OCR detection settings to generate successive sets of code points.

6. The method of claim 1, wherein generating the notification comprises establishing an interconnection across a computer network between a local client device and a server responsive to a match between the first and second code points of the respective first and second strings of text character codes, and preventing an establishment of an interconnection between the local client device and a server across the computer network responsive to the mismatch between the first and second strings of text character codes.

7. The method of claim 1, wherein the image of the converting step comprises a first image with characters arranged in accordance with a first font and the second string of text character codes detected during the applying step are detected from the first image, wherein the method further comprises repeating the converting and applying steps using a different, second font, wherein the first and second strings of text character codes are determined to match using the first font, wherein the first and second strings of text character codes are determined to not match using the second font, and wherein the notification is made responsive to the second font.

8. An apparatus comprising:

an image processor circuit configured to convert a first set of digital data comprising a first string of text character codes into an image file, the image processor circuit comprising an image capture circuit configured to generate the image file as mapping information that nominally describes characters corresponding to the first string of text character codes, the image processor circuit further comprising a smoothing function circuit configured to apply a smoothing function to the image file generated by the image capture circuit to degrade boundaries between adjacent characters;

an optical character recognition (OCR) circuit configured to apply optical character recognition to the image file to generate a second set of digital data comprising a second string of text character codes based on detection of characteristics of the image; and a comparator circuit configured to compare the first string of text character codes extracted from the first set of digital data to the second string of text character codes detected from the image.

9. The apparatus of claim 8, wherein the comparator is further configured to generate a first notification signal responsive to a match between the first and second strings of text character codes, and to generate a different, second notification signal responsive to a mismatch between the first and second strings of text character codes.

10. The apparatus of claim 8, further comprising a code extractor circuit configured to extract a set of original codes corresponding to the first string of text character codes from the first set of digital data and to forward the set of original codes to the comparator circuit.

11. The apparatus of claim 8, wherein the first and second strings of text character codes are respective code points in at least a selected one of an ASCII character encoding scheme or a Unicode character encoding scheme.

12. The apparatus of claim 11, wherein the comparator circuit compares a first code point from the first string of text character codes with a second code point from the second string of text character codes and declares a mismatch based on the first and second code points comprising different numeric code values.

13. The apparatus of claim 8, wherein the first string of text character codes correspond to characters comprising at least a selected one of a URL domain name pointing to a selected web address or an email address.

14. The apparatus of claim 8, further comprising a font library as a data structure in a memory with text character codes corresponding to the codes in the first set of digital data to render the image.

15. The apparatus of claim 14, wherein the image processor circuit utilizes the font library during rendering of the image file.

16. The apparatus of claim 14, wherein the OCR circuit uses the font library during evaluation of the image file.

17. The apparatus of claim 8, wherein the first and second string of text character codes are code points in a Unicode character encoding scheme in accordance with the Unicode standard.

18. The apparatus of claim 8, wherein the image processor circuit is further configured to successively generate different images of the first string of text character codes using different image capture parameters, and wherein the OCR circuit is further configured to apply OCR processing to each of the different images using different OCR detection settings.

19. The apparatus of claim 8, wherein each of the image processor circuit, the OCR circuit and the comparator circuit are realized as programming instructions stored in a memory and executed by one or more programmable processors in a client device.

* * * * *